(12) United States Patent
Kim et al.

(10) Patent No.: US 12,157,860 B2
(45) Date of Patent: Dec. 3, 2024

(54) FCC CO-PROCESSING OF BIOMASS OIL WITH HYDROGEN RICH CO-FEED

(71) Applicant: ExxonMobil Technology and Engineering Company, Annandale, NJ (US)

(72) Inventors: Hyung Rae Kim, Basking Ridge, NJ (US); Jihad M. Dakka, Whitehouse Station, NJ (US); Xiaochun Xu, Basking Ridge, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/838,406

(22) Filed: Jun. 13, 2022

(65) Prior Publication Data

US 2022/0403253 A1    Dec. 22, 2022

Related U.S. Application Data

(60) Provisional application No. 63/202,714, filed on Jun. 22, 2021.

(51) Int. Cl.
*C10G 3/00* (2006.01)

(52) U.S. Cl.
CPC ....... *C10G 3/57* (2013.01); *C10G 2300/1014* (2013.01); *C10G 2300/1044* (2013.01);
(Continued)

(58) Field of Classification Search
CPC .............. C10G 3/57; C10G 2300/1014; C10G 2300/1044; C10G 2300/1074;
(Continued)

(56) References Cited

U.S. PATENT DOCUMENTS

2002/0195373 A1* 12/2002 Ino .................. C10G 69/04
                                                         208/113
2012/0271074 A1   10/2012 Boon et al.
(Continued)

FOREIGN PATENT DOCUMENTS

CA       3179241 A1 * 11/2021    ............. C10G 31/06
WO   2010/068255 A1    6/2010

OTHER PUBLICATIONS

International Search Report and Written Opinion received for PCT Patent Application No. PCT/US2022/033184, mailed on Oct. 5, 2022, 15 pages.
(Continued)

*Primary Examiner* — Thuan D Dang
(74) *Attorney, Agent, or Firm* — Shook, Hardy & Bacon L.L.P.

(57) ABSTRACT

Systems and methods are provided for increasing the yield of products generated during co-processing of biomass oil in a fluid catalytic cracking (FCC) system. The systems and methods can allow for increased yield by reducing or minimizing formation of carbon oxides, gas phase products, and/or coke yields during the co-processing. This can be achieved by adding a hydrogen-rich co-feed to the co-processing environment. Examples of hydrogen-rich co-feeds include high hydrogen content vacuum gas oil co-feed, high hydrogen content distillate co-feed, and/or high hydrogen content naphtha co-feed. Additionally or alternately, various types of fractions that contain a sufficient amount of hydrogen donor compounds can be used to reduce or minimize carbon oxide formation.

14 Claims, 5 Drawing Sheets

(52) U.S. Cl.
CPC ............... *C10G 2300/1074* (2013.01); *C10G 2300/202* (2013.01)

(58) Field of Classification Search
CPC ........ C10G 2300/202; C10G 2300/104; C10G 3/40; C10G 3/49; C10G 11/182; C10G 45/08; C10G 69/04; C10G 69/06; C10G 1/002; C10G 2300/1011; Y02P 30/20
See application file for complete search history.

(56) References Cited

U.S. PATENT DOCUMENTS

2014/0316176 A1   10/2014  Fjare et al.
2017/0190991 A1*  7/2017  Sundberg ............... C10G 11/00

OTHER PUBLICATIONS

Pinho Andrea De Rezende et al., "Fast pyrolysis oil from pinewood chips co-processing with vacuum gas oil in an FCC unit for second generation fuel production", Fuel, IPC Sience and Technology Press, Oct. 15, 2016, pp. 462-473, vol. 188.
De Rezende Pinho, A., etc. al. Fast pyrolysis oil from pinewood chips co-processing with vacuum gas oil in an FCC unit for second generation fuel production, Fuel, 188 (2017) 462-273.
Talmadge, M., etc. al. A perspective on oxygenated species in the refinery integration of pyrolysis oil. Green Chemistry, 16 (2014) 407-453.
De Rezende Pinho, A., etc. al. Co-processing raw bio-oil and gasoil in an FCC Unit, Fuel Processing Technology, 131 (2015) 159-166.

* cited by examiner

FCC CO-PROCESSING OF BIOMASS OIL WITH HYDROGEN RICH CO-FEED

CROSS-REFERENCE TO RELATED APPLICATION

This application claims the priority benefit of U.S. Ser. No. 63/202,714, filed Jun. 22, 2021, which is incorporated herein by reference.

BACKGROUND OF THE INVENTION

Systems and methods are provided for co-processing of biomass oil in a fluid catalytic cracking (FCC) unit.

Fluid catalytic cracking (FCC) processes are commonly used in refineries as a method for converting feedstocks, without requiring additional hydrogen, to produce lower boiling fractions suitable for use as fuels. Typical feedstocks can correspond to vacuum gas oil fractions, since lower boiling fractions are already within the fuels boiling range, while vacuum resid fractions are typically not as suitable for processing under FCC conditions.

Although conventional vacuum gas oil fractions are derived from mineral crude oils, oils derived from biomass can also be formed with boiling ranges similar to the vacuum gas oil boiling range. Some recent work has shown that co-processing of biomass oil with conventional feed can be performed in FCC units.

One of the difficulties in performing co-processing in an FCC unit is that performing FCC processing on a feed containing oxygenates results in production of carbon oxides ($CO$, $CO_2$). Such carbon oxides represent carbon that is not used as a further fuel product in a conventional FCC configuration, and therefore represent a loss of potential yield from the FCC process.

It would be desirable to have systems and methods that can further improve the ability to co-process biomass oil in an FCC reactor and/or that can improve on the product value generated from co-processing of biomass oil in an FCC reactor. In particular, it would be desirable to have systems and methods that can allow for co-processing of biomass oil while maintaining or even improving the net yield from the process.

SUMMARY OF THE INVENTION

In an aspect, a method for co-processing biomass oil is provided. The method includes exposing a combined feed to a catalyst in a reactor under fluid catalytic cracking conditions to form at least a cracked effluent. The combined feed can include 1.0 wt % to 30 wt % biomass oil, relative to a weight of the combined feed. The combined feed can further include at least one additional feedstock, the at least one additional feedstock including 41 wt % or more of a vacuum gas oil boiling range portion relative to a weight of the combined feed, the vacuum gas oil boiling range portion optionally including a hydrogen content of 13.2 wt % or more. Optionally, the at least one additional feedstock and/or the vacuum gas oil boiling range portion can include 40 wt % or more of naphthenes. Optionally, the at least one additional feedstock and/or the vacuum gas oil boiling range portion can include 25 wt % or less of aromatics.

In another aspect, a method for co-processing biomass oil is provided. The method includes exposing a combined feed to a catalyst in a reactor under fluid catalytic cracking conditions to form at least a cracked effluent. The combined feed can include 1.0 wt % to 30 wt % biomass oil, relative to a weight of the combined feed. The combined feed can further include 5.0 wt % to 40 wt %, relative to the weight of the combined feed, of one or more co-feeds having a hydrogen content of 13.8 wt % or more relative to a weight of the one or more co-feeds, the weight percentage of the one or more co-feeds optionally being greater than the weight percentage of the biomass oil. Additionally, the combined feed can include 30 wt % or more of one or more feedstocks, relative to a weight of the combined feed, the one or more feedstocks including at least one of i) a T10 distillation point of 316° C. or higher and ii) a T50 distillation point of 400° C. or higher. Optionally, the one or more co-feeds can include 25 wt % or more of naphthenes. Optionally, the one or more co-feeds can include 15 wt % or less of aromatics. Optionally, the one or more feedstocks can include 13.2 wt % or less of hydrogen.

DETAILED DESCRIPTION

Figure 1:
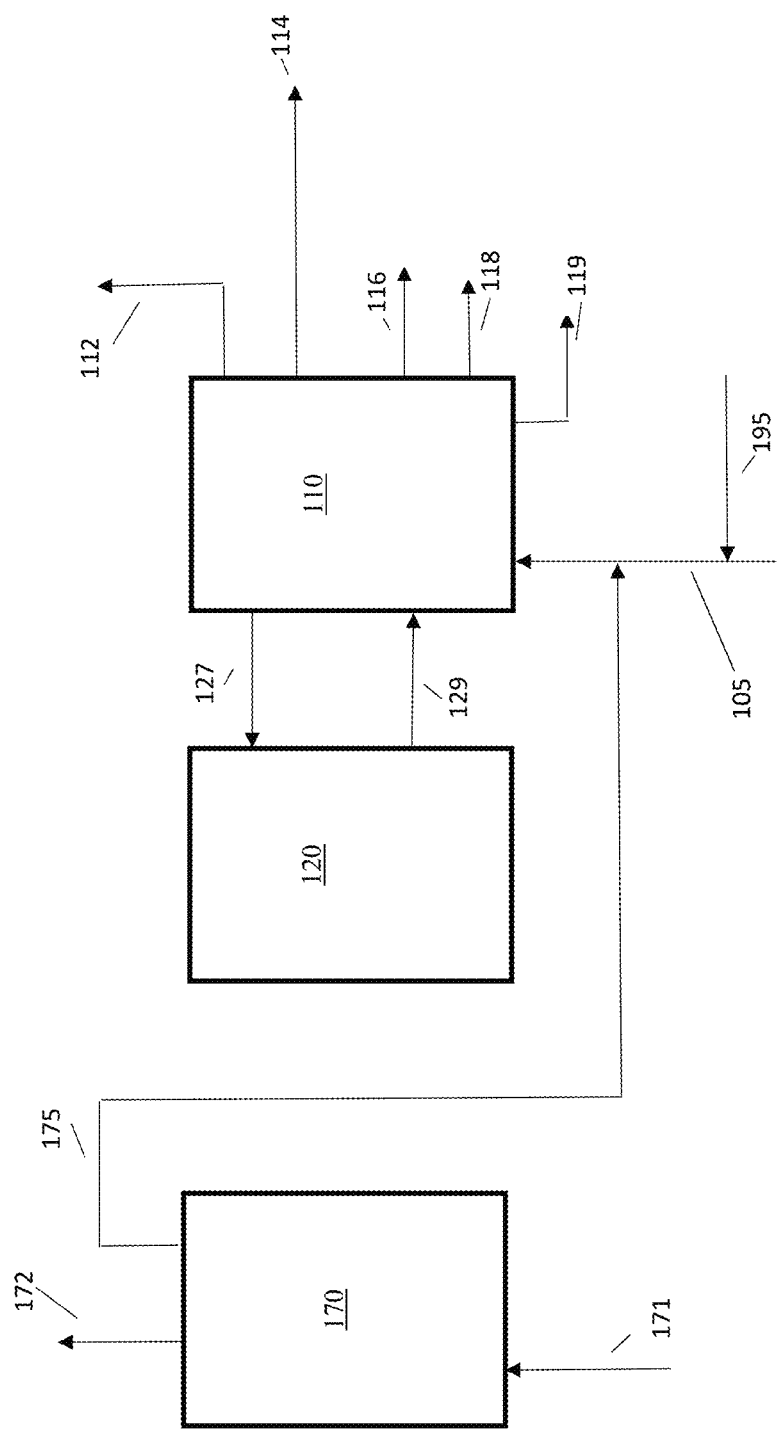
FIG. 1 shows an example of a reaction system for co-processing of biomass oil in an FCC reactor.

All numerical values within the detailed description and the claims herein are modified by "about" or "approximately" the indicated value, and take into account experimental error and variations that would be expected by a person having ordinary skill in the art.

Overview

In various aspects, systems and methods are provided for increasing the yield of products generated during co-processing of biomass oil in a fluid catalytic cracking (FCC) system. The systems and methods can allow for increased yield by reducing or minimizing formation of carbon oxides, gas phase products, and/or coke yields during the co-processing. This can be achieved by adding a hydrogen-rich co-feed to the co-processing environment. Examples of hydrogen-rich co-feeds include high hydrogen content vacuum gas oil co-feed, high hydrogen content distillate co-feed, and/or high hydrogen content naphtha co-feed. Additionally or alternately, various types of fractions that contain a sufficient amount of hydrogen donor compounds can be used to reduce or minimize carbon oxide formation.

In some aspects, the feed for co-processing of biomass oil can correspond to a feed that includes biomass oil, a conventional FCC feedstock, and a hydrogen-rich co-feed, where the hydrogen-rich co-feed includes a hydrogen content of 13.8 wt % or more (or 14.0 wt % or more). Additionally or alternately, in some aspects, the feed for co-processing of biomass oil can correspond to a feed that includes biomass oil and a vacuum gas oil boiling range co-feed with a hydrogen content of 13.2 wt % or higher, or 13.5 wt % or higher. In aspects where the feed includes a mineral vacuum gas oil boiling range co-feed with a hydrogen content of 13.2 wt % or higher (or 13.5 wt % or higher), the vacuum gas oil boiling range co-feed can preferably have a T5 distillation point of 316° C. or higher, a T50 distillation point of 400° C. or higher, or a combination thereof.

Without being bound by any particular theory, it is believed that naphthenes or optionally paraffins within a high hydrogen content co-feed can act as hydrogen donors within the FCC reaction environment. These hydrogen donors can provide hydrogen that allows formation of water in place of carbon oxides. Additionally, by adding high hydrogen content compounds, it is believed that the reactions that lead to coke formation (such as by further removal of hydrogen from aromatic cores) can be reduced or minimized. It is believed that the mechanisms for mitigating formation of carbon oxides and coke can also reduce or minimize formation of gas phase ($C_{4-}$) products.

It is noted that conventional FCC feedstocks and FCC product fractions typically have hydrogen contents below 13 wt %. Table 1 shows examples of several hydrocarbon fractions.

TABLE 1

Examples of Potential FCC Feed and Product Compositions

| Wt % | Non-hydrotreated virgin VGO | Conventional FCC naphtha | High saturates, low heteroatom VGO | High saturates, low heteroatom Crude Oil | Heavy HDT VGO |
|---|---|---|---|---|---|
| C | 86.4 | | | | 86.5 |
| H | 11.94 | 8-13 | 13.5 | 13.6 | 13.3 |

As shown in Table 1, a typical non-hydrotreated straight run vacuum gas oil feedstock can have a hydrogen content of around 12 wt % or less. The naphtha fraction generated from FCC processing is also less than 13 wt % hydrogen, so that a recycle stream in a conventional FCC processing configuration will not provide a high hydrogen content stream. However, it is possible for a vacuum gas oil boiling range fraction to have sufficient hydrogen for use as a high hydrogen content co-feed. For example, vacuum gas oil fractions derived from a high saturates, low heteroatom content crude oil can have hydrogen contents of 13.5 wt % or higher. Certain types of shale crude oils are examples of such high saturates, low heteroatom content crude oils. It is noted that such shale crude oil fractions can also potentially contain a limited amount of vacuum resid, so that the entire crude oil can be used as an FCC co-feed. As another example, heavily hydrotreating a conventional vacuum gas oil fraction can potentially produce a vacuum gas oil boiling range feedstock with a hydrogen content of up to 13.3 wt %.

While FCC conversion of vacuum gas oil feeds is effective for production of naphtha and cycle oils, a long term goal of many refineries is to increase the utilization of renewable feedstock. Using biomass oil as a co-feed during FCC processing provides an option for increasing the renewable content of fuels formed at a refinery while reducing or minimizing the amount of new processing stages that are required. Additionally, co-processing of biomass oils, such as pyrolysis oils, in an FCC unit can allow pyrolysis oils derived from biomass to be upgraded to conventional fuel products using existing refinery processes, as opposed to requiring development of new process flows and/or construction of new refinery process trains. Unfortunately, the yield of fuel products from co-processed biomass oil can be reduced due to several competing side reactions that occur under FCC processing conditions. First, the oxygen atoms in biomass oil can be converted to carbon oxides under FCC processing conditions. This represents a loss of yield in a conventional FCC system, as the CO and/or $CO_2$ forms part of a low value overhead gas. Thus, the carbon atoms incorporated into the CO and/or $CO_2$ do not form fuel products.

A second loss of yield is due to coke formation. Without being bound by any particular theory, it is believed that oxygenates within biomass oil can undergo aldol condensation reactions. This can lead to formation of aromatic compounds. Unfortunately, the condensation reaction that results in aromatic compound formation can also result in formation of coke.

Co-Processing of Biomass Oil and High Hydrogen Content VGO

It has been discovered that the formation of carbon oxides and/or formation of coke during FCC co-processing of biomass oil can be reduced or minimized by adding a high hydrogen content stream to the feed for co-processing. In some aspects, the high hydrogen content stream can correspond to a feed containing a substantial portion of vacuum gas oil boiling range components. Examples of such feeds can include, but are not limited to, vacuum gas oil boiling range feeds, atmospheric resids, and/or other feeds vacuum gas oil boiling range components while also including a sufficiently low content of 566° C.+ components to be suitable for use as a feed to an FCC process.

In aspects where the high hydrogen content stream corresponds to a stream containing a substantial portion of vacuum gas oil boiling range components, the mineral vacuum gas oil boiling portion of the combined feed can correspond to 41 wt % or more of the combined feed. In such aspects, the mineral vacuum gas oil boiling range portion of the high hydrogen content stream can have a hydrogen content of 13.2 wt % or more, or 13.5 wt % or more, such as up to 15.0 wt % or possibly still higher. Without being bound by any particular theory, it is believed that a high hydrogen content feedstock including a substantial portion of vacuum gas oil boiling range components can provide hydrogen transfer compounds that provide alternative reaction pathways for conversion of oxygenates under FCC processing conditions. It is believed that these alternative reaction pathways allow increased amounts of olefins and water to be formed from oxygenate functional groups, thereby decreasing the amounts of coke and carbon oxides that are formed.

In aspects where the high hydrogen content stream includes a substantial portion of vacuum gas oil boiling range components, relative to the total combined feed for co-processing, the biomass oil can correspond to 1.0 wt % to 30 wt % of the combined feed, or 5.0 wt % to 30 wt %, or 10 wt % to 30 wt %, or 1.0 wt % to 20 wt %, or 5.0 wt % to 20 wt %, or 10 wt % to 20 wt %, or 1.0 wt % to 15 wt %, or 5.0 wt % to 15 wt %, or 1.0 wt % to 10 wt %. The (mineral) vacuum gas oil boiling range portion of the combined feed can correspond to 41 wt % to 99 wt % of the combined feed, or 51 wt % to 99 wt %, or 61 wt % to 99 wt %, such as up to having the balance of the feed correspond to a vacuum gas oil boiling range portion (70 wt % to 99 wt %). Optionally, one or more lower boiling fractions (i.e., naphtha and/or diesel boiling range fraction) can also be included. Such additional optional fractions, if present, can correspond to 0.1 wt % to 30 wt % of the combined feed. Optionally, one or more 566° C.+ fractions can also be included. Such additional optional 566° C.+ fractions, if present, can correspond to 0.1 wt % to 20 wt % of the combined feed, or 0.1 wt % to 10 wt %. It is noted that combined feeds containing 0.1 wt % or less of lower boiling fractions (i.e., naphtha and/or diesel boiling range fractions) are considered to contain substantially no lower boiling fractions. Similarly, combined feeds containing 0.1 wt % or less of a 566° C.+ fraction are considered to contain substantially no 566° C.+ fraction.

In some aspects, a high hydrogen content stream can have a reduced or minimized content of aromatics. In such aspects, the high hydrogen content stream and/or the vacuum gas oil boiling portion of the high hydrogen content stream can include 25 wt % or less aromatics, or 20 wt % or less, or 20 wt % or less, such as down to 5.0 wt % or possibly still lower. Additionally or alternately, such a high hydrogen content stream and/or such a vacuum gas oil boiling range portion can include 40 wt % or more naphthenes, or 45 wt % or more, or 50 wt % or more, such as up to 75 wt % or possibly still higher.

In some aspects, the oxygen content of the combined feed can be 0.5 wt % or more, or 1.0 wt % or more, or 2.0 wt % or more, such as up to 5.0 wt % or possibly still higher. For example, a hypothetical pyrolysis oil could have an oxygen content (excluding any included water) of 40 wt %. If the pyrolysis oil (excluding water) corresponds to 5.0 wt % of the feed, then the resulting combined feed would have an oxygen content of 2.0 wt %. It is noted that some biomass oils contain water. When determining the oxygen content of the combined feed, as defined herein, any water present in the biomass oil is excluded from the calculation of oxygen content.

The biomass oil and the high hydrogen content feedstock including a substantial portion of vacuum gas oil boiling range components can be combined in any convenient location. The combined feed can be formed by mixing the biomass oil and the high hydrogen content feedstock together prior to entering the FCC reactor, after entering the FCC reactor, or some mixing can occur both before and after entering the reactor.

Co-Processing of Biomass Oil, Conventional FCC Feedstock, and High Hydrogen Content Co-Feed In other aspects, for FCC co-processing of biomass oil where a substantial portion of the feed corresponds to a mineral vacuum gas oil boiling range feedstock with a hydrogen content of less than 13.2 wt % (or 13.5 wt % or less), various types of high hydrogen content co-feeds can be used. A naphtha co-feed or a distillate co-feed with a sufficiently high hydrogen content is an example of a suitable high hydrogen content stream. Conventionally, addition of a naphtha co-feed to a feedstock for FCC processing would not be considered beneficial, as a naphtha co-feed already has a desirable boiling range for a fuel product. However, it has been discovered that addition of a naphtha co-feed can improve the overall product yield from FCC co-processing of biomass oil, even after accounting for conversion of a portion of the naphtha from the naphtha co-feed into low value light ends (i.e., saturated $C_{4-}$ products).

Without being bound by any particular theory, it is believed that a lower boiling high hydrogen content co-feed can provide hydrogen transfer compounds that provide alternative reaction pathways for conversion of oxygenates under FCC processing conditions. It is believed that these alternative reaction pathways allow increased amounts of olefins and water to be formed from oxygenate functional groups, thereby decreasing the amounts of coke and carbon oxides that are formed. However, due to the lower boiling range of a naphtha or diesel boiling range co-feed, the ability to form naphthenes from paraffins under FCC operating conditions is reduced relative to a high hydrogen content feed that includes a substantial portion of vacuum gas oil boiling range components. Due to this reduced or minimized ability to convert paraffins to naphthenes under FCC conditions, it is believed that a higher hydrogen content is needed for a naphtha and/or diesel boiling range co-feed to achieve the benefits of using a high hydrogen content co-feed.

More generally, any convenient type of liquid co-feed with a sufficiently high hydrogen content can be used as a co-feed to improve the yield during FCC co-processing of biomass oil with a substantial portion of a vacuum gas oil boiling range fraction having a hydrogen content of 13.2 wt % or less. A high hydrogen content liquid co-feed can be beneficial to use when performing FCC co-processing on a feedstock that includes at least one biomass oil and at least one feed corresponding to a conventional FCC feed boiling range. A liquid co-feed is defined as a co-feed with a T10 distillation point of 30° C. or higher, or 45° C. or higher, or 60° C. or higher. Such a liquid co-feed can have any convenient T90 distillation point that is similar to or lower than a conventional FCC feedstock. In some aspects, a high hydrogen content liquid co-feed can have a T90 distillation point of 260° C. or less, or 235° C. or less, or 220° C. or less, or 204° C. or less. In still other aspects, any co-feed can be used so that 30 wt % or more of the combined feed corresponds to mineral vacuum gas oil boiling range components with a hydrogen content of 13.2 wt % or less, or 13.0 wt % or less, or 12.5 wt % or less, or 12.0 wt % or less, such as down to 9.0 wt % or possibly still lower. For a high hydrogen content liquid co-feed, the hydrogen content of the co-feed can be 13.8 wt % or more, or 14.0 wt % or more, such as up to 16.0 wt % or possibly still higher.

An example of a high hydrogen content liquid co-feed can correspond to a naphtha boiling range co-feed. In some aspects, a naphtha boiling range co-feed can have a reduced or minimized content of aromatics. In such aspects, a naphtha boiling range co-feed can include 15 wt % or less aromatics, or 10 wt % or less, or 6.0 wt % or less, such as down to containing substantially no aromatics. Additionally or alternately, such a naphtha boiling range co-feed can include 15 wt % or more naphthenes, or 25 wt % or more, or 30 wt % or more, or 35 wt % or more, such as up to 60 wt % or possibly still higher. Other examples of high hydrogen content liquid co-feeds can include liquid co-feeds including a hydrogen content of 13.8 wt % or more and a naphthenes content of 15 wt % to 100 wt %, or 15 wt % to 80 wt %, or 25 wt % to 100 wt %, or 25 wt % to 80 wt %, or 30 wt % to 100 wt %, or 30 wt % to 80 wt %, or 40 wt % to 100 wt %, or 40 wt % to 80 wt %.

In various aspects, biomass oil can be co-processed with one or more primary feedstocks, such as mineral vacuum gas oil feeds; and one or more high hydrogen content co-feeds, such as naphtha and/or diesel boiling range co-feeds. Relative to the total combined feed for co-processing, the biomass oil can correspond to 1.0 wt % to 30 wt % of the combined feed, or 5.0 wt % to 30 wt %, or 10 wt % to 30 wt %, or 1.0 wt % to 20 wt %, or 5.0 wt % to 20 wt %, or 10 wt % to 20 wt %, or 1.0 wt % to 15 wt %, or 5.0 wt % to 15 wt %, or 1.0 wt % to 10 wt %.

In various aspects, the one or more high hydrogen content co-feeds can correspond to 5.0 wt % to 40 wt % of the combined feed, or 5.0 wt % to 30 wt %, or 5.0 wt % to 20 wt %, or 10 wt % to 40 wt %, or 10 wt % to 30 wt %, or 10 wt % to 20 wt %. Additionally or alternately, the amount of the one or more high hydrogen content co-feeds can be greater than the amount of the biomass oil. For example, the weight percentage of high hydrogen content co-feed(s) in the combined feed can be 4.0 wt % or more greater than the amount of biomass oil in the combined feed, or 9.0 wt % or more greater than the amount of biomass oil, or 15 wt % or more greater than the amount of biomass oil, such as being greater than the amount of biomass oil by up to 30 wt % or possibly still higher.

For the primary feedstocks, the one or more primary feedstocks can correspond to (optionally mineral) feedstocks with a conventional boiling range for FCC processing. The primary feedstocks can correspond to 30 wt % to 94 wt % of the combined feed, or 40 wt % to 94 wt %, or 50 wt % to 94 wt %, or 60 wt % to 94 wt %, or 30 wt % to 85 wt %, or 40 wt % to 85 wt %, or 50 wt % to 85 wt %, or 60 wt % to 85 wt %. Additionally or alternately, in some aspects the one or more primary feedstocks can correspond to the balance of the combined feed. Further additionally or alternately, in some aspects where 10 wt % or more of the combined feed corresponds to a naphtha boiling range co-feed, the primary feedstocks can correspond to 40 wt % or more, or 50 wt % or more, or 60 wt % or more of the combined feed.

Another option for characterizing the combined feed can be based on the difference in hydrogen content between the one or more primary feedstocks and the one or more high hydrogen content co-feeds. For example, the one or more high hydrogen content co-feeds can have a hydrogen content that is greater than the hydrogen content of the one or more primary feedstocks by 2.0 wt % or more, or 2.5 wt % or more, such as the high hydrogen content co-feed(s) having a hydrogen content that is greater than the hydrogen content of the primary feedstock(s) by 6.0 wt % or possibly still more. In such aspects, the one or more primary feedstocks can have a hydrogen content of 12.5 wt % or less, or 12.2 wt % or less, or 12.0 wt % or less, or 11.8 wt % or less, such as down to 11.0 wt %, or down to 10.5 wt %, or possibly still lower.

In some aspects, the oxygen content of the combined feed can be 0.5 wt % or more, or 1.0 wt % or more, or 2.0 wt % or more, such as up to 5.0 wt % or possibly still higher. For example, a hypothetical pyrolysis oil could have an oxygen content (excluding any included water) of 40 wt %. If the pyrolysis oil (excluding water) corresponds to 5.0 wt % of the feed, then the resulting combined feed would have an oxygen content of 2.0 wt %. It is noted that some biomass oils contain water. When determining the oxygen content of the combined feed, as defined herein, any water present in the biomass oil is excluded from the calculation of oxygen content.

The biomass oil, the high hydrogen content co-feed(s), and/or the primary feedstock(s) can be combined in any convenient location. The combined feed can be formed by mixing biomass oil, co-feed(s), and primary feedstock(s) together prior to entering the FCC reactor, after entering the FCC reactor, or some mixing can occur both before and after entering the reactor.

Definitions

In this discussion, a biomass conversion product corresponds to any product generated by exposure of biomass to a conversion process. Pyrolysis processes, such as fast pyrolysis or hydrothermal liquefaction, are examples of conversion processes. Other types of conversion processes can include, but are not limited, to, physical and chemical conversion processes that result in production of a liquid biomass product. This can include processes for recovering a product such as a vegetable oil (e.g., canola oil) from a biomass source. In this discussion, "biomass light gas" is defined as any conversion products from a biomass conversion process that would be gas phase at 20° C. and 100 kPa-a. In this discussion, "biomass oil" is defined as any conversion products from a biomass conversion process that would be liquid phase at 20° C. and 100 kPa-a. It is noted that biomass oil has a boiling range that is broader than the boiling range for a vacuum gas oil that would typically be used as an FCC feed.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

In this discussion, conversion of a feed within an FCC reactor is defined based on conversion relative to 430° F. (221° C.). In this discussion, the amount of conversion relative to 221° C. is calculated based on Equation (1).

$$\text{Conversion at } 221°\text{ C.} = \frac{100\% - LCO\ \% - \text{Bottoms }\% - \text{Water in Feed }\%}{100\% - \text{Water in Feed }\%} \quad (1)$$

In Equation (1), LCO % refers to the amount of light cycle oil in the liquid products. The light cycle oil corresponds to a 221° C.-343° C. fraction of the liquid effluent. Bottoms % refers to the amount of 343° C.+ bottoms in the liquid product. Water in Feed % refers to the amount of water present in the feed. Although conventional FCC feeds to not typically contain water, various types of biomass oils often contain water. Depending on the method of forming the biomass oil, the water content of a biomass oil can be up to roughly 25 wt % of the biomass oil. In this discussion, when determining conversion relative to 221° C., Equation (1) allows conversion to be calculated on a dry basis. It is noted that based on the definition in Equation (1), any coke formed during the FCC reaction is also counted as a conversion product, since coke is not part of the light cycle oil fraction or bottoms fraction.

In this discussion, the naphtha boiling range is defined as roughly 30° C. to 221° C. It is noted that the boiling point of $C_5$ paraffins is roughly 30° C., so the naphtha boiling range can alternatively be referred to as $C_5$-221° C. A naphtha boiling range fraction is defined as a fraction having a T10 distillation point of 30° C. or more and a T90 distillation point of 221° C. or less. The diesel boiling range and/or the light cycle oil boiling range is defined as 180° C. to 370° C. A diesel boiling range fraction is defined as a fraction having a T10 distillation point of 180° C. or more, and a T90 distillation point of 370° C. or less. In this discussion, the FCC bottoms boiling range is defined as 340° C.+. The vacuum gas oil boiling range is defined as 340° C. to 566° C. A vacuum gas oil boiling range fraction can have a T10 distillation point of 340° C. or higher and a T90 distillation point of 566° C. or less. An FCC bottoms fraction can have a T10 distillation point of 340° C. or more. An FCC bottoms fraction can have a T90 distillation point of 625° C. or less, or 600° C. or less, or 566° C. or less, or 550° C. or less, or 525° C. or less. An atmospheric resid can correspond to a fraction having a T10 distillation point of 343° C. or higher. For a general atmospheric resid, the T90 distillation point could be relatively high, such as 650° C. or possibly higher. However, for atmospheric resids derived from some shale oil fractions having a high ratio of naphthenes to aromatics, such an atmospheric resid can have a T90 distillation point of 600° C. or less. It is noted that the definitions for naphtha boiling range fraction, distillate boiling range fraction, vacuum gas oil boiling range, and FCC bottoms boiling range are based on boiling point only. Thus, a distillate boiling range fraction, naphtha boiling range fraction, vacuum gas oil boiling range fraction, or FCC bottoms boiling range fraction can include components that did not pass through a distillation tower or other separation stage based on boiling point. A shale oil vacuum gas oil boiling range fraction is defined as a shale oil fraction corresponding to the vacuum gas oil boiling range. Similarly, a shale oil atmospheric resid is defined as a shale oil fraction corresponding to the atmospheric resid boiling range.

In this discussion, boiling points and/or fractional weight distillation points (such as T5, T10, T50, T90, or T95 distillation points) can be determined according to ASTM D2887. If for some reason a fraction is either too low boiling or too high boiling to be suitable for characterization according to ASTM D2887, either ASTM D86 or ASTM D7169 can be used instead. In this discussion, a fractional weight distillation point ("Txx") refers to the percentage "xx" of a sample that will boil at the specified temperature "T".

In this discussion, a total liquid product yield can be referred to. The total liquid product yield is defined herein as the combined amount of all $C_{5+}$ fluid products. This includes any products suitable for inclusion in naphtha, light cycle oil(s), heavy cycle oil(s), and main column bottoms generated in the FCC reactor, relative to the weight of the combined feed. Thus, the total liquid product excludes any coke, carbon oxides, water, or gas ($C_1$ to $C_4$ compounds) formed in the FCC process. In this discussion, yields of other products, such as CO, $CO_2$, gases, or coke, are also specified relative to the weight of the combined feed to the FCC reactor, unless stated otherwise.

Formation of Biomass Oil

The biomass used as feed for a biomass conversion process can be any convenient type of biomass. Examples of suitable biomass sources can include woody biomass and switchgrass. More generally, the biomass used as feed for a biomass conversion process can be any convenient type of biomass. Some forms of biomass can include direct forms of biomass, such as algae biomass and plant biomass. Other forms of biomass may correspond to waste products, such as food waste, animal waste, paper, and/or other waste products originally formed from biomass materials. In this discussion, municipal solid waste is included within the definition of biomass, even though a portion of the solids in municipal solid waste may not strictly correspond to solids derived from biomass.

In addition to carbon, oxygen, and hydrogen, depending on the form of the biomass, other heteroatoms may be present such as nitrogen, phosphorus, sulfur, and/or various metals. Biomass can generally have a molar ratio of hydrogen to carbon of 2:1 or less, but that is typically accompanied by a substantial amount of oxygen. Thus, conversion of biomass without using additional hydrogen typically results in production of liquid products (e.g., biomass oil) with hydrogen to carbon molar ratios substantially below 2:1. This is part of why co-processing in an FCC unit is desirable for biomass oil, as FCC processing provides a way to upgrade biomass oil to fuel products/fuel blending products without having to add substantial amounts of hydrogen to the reaction environment.

In aspects where the biomass is introduced into a reaction environment at least partially as solids, having a small particle size can facilitate transport of the solids into the reactor or other reaction environment. In some instances, smaller particle size can potentially also contribute to achieving a desired level of conversion of the biomass under the short residence time conditions. Thus, one or more optional physical processing steps can be used to prepare solid forms of biomass for conversion. In such optional aspects, the solids can be crushed, chopped, ground, or otherwise physically processed to reduce the median particle size to 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

Biomass oil can be formed from biomass using any convenient conversion process that does not involve substantial addition of $H_2$ to the conversion environment. Various types of pyrolysis processes are some examples of biomass conversion processes, such as fast pyrolysis, catalytic pyrolysis, or hydrothermal liquefaction.

Hydrothermal liquefaction is a process where biomass is exposed to an aqueous reaction environment at temperatures between 250° C. to 550° C. and pressures of roughly 5 MPa-a to 25 MPa-a. In many instances, a catalyst is also included in the reaction environment, such as an alkali metal catalyst. The biomass is exposed to the aqueous reaction environment under the hydrothermal liquefaction conditions for a period of 10 minutes to 60 minutes. The resulting products (biomass light gas, biomass oil) can then be separated from the aqueous environment.

Another type of conversion process can be a fast pyrolysis process. During pyrolysis, the biomass is exposed to temperatures of 450° C. to 600° C. in a substantially $O_2$-free environment. The biomass oil can then be condensed from the resulting vapors formed by the pyrolysis process. A variation on a fast pyrolysis process can be a catalytic fast pyrolysis process. The catalyst in a catalytic fast pyrolysis process can be, for example, an acidic catalyst, such as a silica catalyst, an alumina catalyst, or a zeotype catalyst. Catalytic fast pyrolysis can be used to increase the rate of conversion of the biomass to products. Still another variation can be autothermal pyrolysis, where oxygen is included in the pyrolysis environment. This can allow for partial oxidation/combustion of char and/or biomass in the pyrolysis environment to provide heat for the pyrolysis reaction.

In various aspects, such as aspects involving pyrolysis, the biomass conversion process can generate at least a light gas product and biomass oil. (It is noted that other types of conversion processes may generate only a plurality of liquid products, rather than generating at least one light gas product.) Many types of conversion processes can also generate char or other solid products formed primarily from carbon. The biomass oil can generally correspond to $C_{5+}$ hydrocarbonaceous compounds that are formed during the biomass conversion process, although other compounds (such as acetone) could be present if they are liquid at 20° C. and 100 kPa-a. The oxygen content of the biomass oil can vary depending on the nature of the conversion process used to form the biomass. In some aspects, the oxygen content of the biomass oil can be between 2.0 wt % to 60 wt %, or 2.0 wt % to 50 wt %, or 5.0 wt % to 60 wt %, or 5.0 wt % to 50 wt %, or 10 wt % to 60 wt %, or 10 wt % to 50 wt %. It is noted that the range of oxygen contents may be somewhat lower for biomass oil formed by certain methods, such as hydrothermal liquefaction. In some aspects, the biomass oil can have an oxygen content of 5.0 wt % to 20 wt %, or 5.0 wt. % to 15 wt. %.

In addition to a general oxygen content, in some aspects the oxygen-containing species in a biomass oil can include 5.0 wt % or more of alcohols (relative to a weight of the biomass oil), or 10 wt % or more of alcohols, such as up to 25 wt % or possibly still higher. Additionally or alternately, in some aspects the oxygen-containing species in a biomass oil can include 5.0 wt % or more of phenols (relative to a weight of the biomass oil), or 10 wt % or more of phenols, such as up to 25 wt % or possibly still higher. Further additionally or alternately, in some aspects the oxygen-containing species in a biomass oil can include 5.0 wt % or more of ketones, or 10 wt % or more of ketones, such as up to 25 wt % or possibly still higher.

Because of the nature of how pyrolysis oil is formed, the content of fatty acid alkyl esters in the biomass oil can be relatively low. In various aspects, the biomass oil can include 10 wt % or less of fatty acid alkyl esters, or 5.0 wt % or less, such as down to having substantially no content of fatty acid alkyl esters.

It is noted that some methods for formation of biomass oil can result in substantial amounts of water being included in the biomass oil. When determining the composition of a biomass oil (i.e., carbon, oxygen, hydrogen weight percentages), the water can be excluded from consideration. When determining weight percentages for a combined feed, unless specified otherwise, the amount of pyrolysis oil added to the combined feed includes any water contained within the pyrolysis oil.

The light gas product can generally include $C_{4-}$ hydrocarbonaceous compounds, as well as CO, $CO_2$, and $H_2O$. Various contaminant gases are usually present, such as $NH_3$ or $H_2S$. Additionally, small particulates can be entrained in the light gas product, such as catalyst particles and/or char particulates formed during the pyrolysis.

Other Feeds for Co-Processing

A wide range of petroleum and chemical feedstocks can be used as a feed for FCC processing and/or hydroprocessed to form an FCC input feed suitable for FCC processing. Suitable feedstocks include whole and reduced petroleum crudes, cycle oils, gas oils, including vacuum gas oils and coker gas oils, light to heavy distillates including raw virgin distillates, hydrocrackates, hydrotreated oils, extracts, slack waxes, Fischer-Tropsch waxes, raffinates, and mixtures of these materials.

Suitable feeds for use as an FCC input feed and/or for hydroprocessing to form an FCC input feed can include, for example, feeds with an initial boiling point and/or a T5 boiling point and/or T10 boiling point of at least ~600° F. (~316° C.), or at least ~650° F. (~343° C.), or at least ~700° F. (371° C.), or at least ~750° F. (~399° C.). Additionally or alternately, the final boiling point and/or T95 boiling point and/or T90 boiling point of the feed can be ~1100° F. (~593° C.) or less, or ~1050° F. (~566° C.) or less, or ~1000° F. (~538° C.) or less, or ~950° F. (~510° C.) or less. In particular, a feed can have a T5 to T95 boiling range of ~316° C. to ~593° C., or a T5 to T95 boiling range of ~343° C. to ~566° C., or a T10 to T90 boiling range of ~343° C. to ~566° C. Optionally, it can be possible to use a feed that includes a lower boiling range portion. Such a feed can have an initial boiling point and/or a T5 boiling point and/or T10 boiling point of at least ~350° F. (~177° C.), or at least ~400° F. (~204° C.), or at least ~450° F. (~232° C.). In particular, such a feed can have a T5 to T95 boiling range of ~177° C. to ~593° C., or a T5 to T95 boiling range of ~232° C. to ~566° C., or a T10 to T90 boiling range of ~177° C. to ~566° C. Optionally, the feed can have a T50 distillation point of 400° C. or higher, or 425° C. or higher, such as up to 550° C. or possibly still higher.

In some aspects, the feed for forming an FCC input feed and/or for hydroprocessing to form an FCC input feed can have a sulfur content of ~500 wppm to ~50000 wppm or more, or ~500 wppm to ~20000 wppm, or ~500 wppm to ~10000 wppm. Additionally or alternately, the nitrogen content of such a feed can be ~20 wppm to ~8000 wppm, or ~50 wppm to ~4000 wppm. In some aspects, the feed can correspond to a "sweet" feed, so that the sulfur content of the feed can be ~10 wppm to ~500 wppm and/or the nitrogen content can be ~1 wppm to ~100 wppm.

In some aspects, prior to FCC processing, a vacuum gas oil boiling range feedstock for co-processing and/or a primary feedstock for co-processing with another high hydrogen content feedstock can be hydrotreated. An example of a suitable type of hydrotreatment can be hydrotreatment under trickle bed conditions. Hydrotreatment can be used, optionally in conjunction with other hydroprocessing, to form an input feed for FCC processing based on an initial feed. As noted above, the initial feed can correspond to a catalytic slurry oil and/or a feed including a vacuum gas oil boiling range portion.

Hydroprocessing (such as hydrotreating) can be carried out in the presence of hydrogen. A hydrogen stream can be fed or injected into a vessel or reaction zone or hydroprocessing zone corresponding to the location of a hydroprocessing catalyst. Hydrogen, contained in a hydrogen "treat gas," can be provided to the reaction zone. Treat gas, as referred to herein, can be either pure hydrogen or a hydrogen-containing gas stream containing hydrogen in an amount that for the intended reaction(s). Treat gas can optionally include one or more other gasses (e.g., nitrogen and light hydrocarbons such as methane) that do not adversely interfere with or affect either the reactions or the products. Impurities, such as $H_2S$ and $NH_3$ are undesirable and can typically be removed from the treat gas before conducting the treat gas to the reactor. In aspects where the treat gas stream can differ from a stream that substantially consists of hydrogen (i.e., at least 99 vol % hydrogen), the treat gas stream introduced into a reaction stage can contain at least 50 vol %, or at least 75 vol % hydrogen, or at least 90 vol % hydrogen.

During hydrotreatment, a feedstock can be contacted with a hydrotreating catalyst under effective hydrotreating conditions which include temperatures in the range of 450° F. to 800° F. (~232° C. to ~427° C.), or 550° F. to 750° F. (~288° C. to ~399° C.); pressures in the range of 1.5 MPag to 20.8

MPag (~200 to ~3000 psig), or 2.9 MPag to 13.9 MPag (~400 to ~2000 psig); a liquid hourly space velocity (LHSV) of from 0.1 to 10 hr$^{-1}$, or 0.1 to 5 hr$^{-1}$; and a hydrogen treat gas rate of from 430 to 2600 Nm$^3$/m$^3$ (~2500 to ~15000 SCF/bbl), or 850 to 1700 Nm$^3$/m$^3$ (~5000 to ~10000 SCF/bbl).

In an aspect, the hydrotreating step may comprise at least one hydrotreating reactor, and optionally may comprise two or more hydrotreating reactors arranged in series flow. A vapor separation drum can optionally be included after each hydrotreating reactor to remove vapor phase products from the reactor effluent(s). The vapor phase products can include hydrogen, H$_2$S, NH$_3$, and hydrocarbons containing four (4) or less carbon atoms (i.e., "C$_4$-hydrocarbons"). Optionally, a portion of the C$_3$ and/or C$_4$ products can be cooled to form liquid products. The effective hydrotreating conditions can be suitable for removal of at least about 70 wt %, or at least about 80 wt %, or at least about 90 wt % of the sulfur content in the feedstream from the resulting liquid products. Additionally or alternately, at least about 50 wt %, or at least about 75 wt % of the nitrogen content in the feedstream can be removed from the resulting liquid products. In some aspects, the final liquid product from the hydrotreating unit can contain less than about 1000 ppmw sulfur, or less than about 500 ppmw sulfur, or less than about 300 ppmw sulfur, or less than about 100 ppmw sulfur.

The effective hydrotreating conditions can optionally be suitable for incorporation of a substantial amount of additional hydrogen into the hydrotreated effluent. During hydrotreatment, the consumption of hydrogen by the feed in order to form the hydrotreated effluent can correspond to at least 500 SCF/bbl (~85 Nm$^3$/m$^3$) of hydrogen, or at least 1000 SCF/bbl (~170 Nm$^3$/m$^3$), or at least 2000 SCF/bbl (~330 Nm$^3$/m$^3$), or at least 2200 SCF/bbl (~370 Nm$^3$/m$^3$), such as up to 5000 SCF/bbl (~850 Nm$^3$/m$^3$) or more.

Hydrotreating catalysts suitable for use herein can include those containing at least one Group VIA metal and at least one Group VIII metal, including mixtures thereof. Examples of suitable metals include Ni, W, Mo, Co and mixtures thereof, for example CoMo, NiMoW, NiMo, or NiW. These metals or mixtures of metals are typically present as oxides or sulfides on refractory metal oxide supports. The amount of metals for supported hydrotreating catalysts, either individually or in mixtures, can range from ~0.5 to ~35 wt %, based on the weight of the catalyst. Additionally or alternately, for mixtures of Group VIA and Group VIII metals, the Group VIII metals can be present in amounts of from ~0.5 to ~5 wt % based on catalyst, and the Group VIA metals can be present in amounts of from 5 to 30 wt % based on the catalyst. A mixture of metals may also be present as a bulk metal catalyst wherein the amount of metal can comprise ~30 wt % or greater, based on catalyst weight. Suitable metal oxide supports for the hydrotreating catalysts include oxides such as silica, alumina, silica-alumina, titania, or zirconia. Examples of aluminas suitable for use as a support can include porous aluminas such as gamma or eta.

FCC Processing Conditions

An example of a suitable reactor for performing an FCC process can be a riser reactor. Within the reactor riser, the feeds for co-processing can be contacted with a catalytic cracking catalyst under cracking conditions thereby resulting in spent catalyst particles containing carbon deposited thereon and a lower boiling product stream. The cracking conditions can include: temperatures from 900° F. to 1060° F. (~482° C. to ~571° C.), or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In some aspects, the FCC feed residence time in the reaction zone can be less than 5 seconds, or from 3 to 5 seconds, or from 2 to 3 seconds.

Catalysts suitable for use within the FCC reactor herein can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.7 nm which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (ALPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L. ZK-4, ZK-5, B, E, F, H, J, M, Q, T, W, Z, alpha and beta, omega, REY and USY zeolites. In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix can be made from an inorganic oxide sol or gel which can be dried to "glue" the catalyst components together. Preferably, the inorganic oxide matrix can be comprised of oxides of silicon and aluminum. It can be preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts be present in the same or different catalyst particles, in the aforesaid inorganic oxide matrix.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from 1200° F. to 1400° F. (~649 to 760° C.). The majority of, and preferably substantially all of the hot regenerated catalyst particles can then be recycled to the FCC reaction zone where they contact injected FCC feed.

Example of Reaction System Configuration

FIG. 1 shows an example of a reaction system for co-processing of biomass oil with one or more primary co-feeds and one or more high hydrogen content co-feeds.

In FIG. 1, a biomass oil feed 175 is co-processed in an FCC reaction system 110 with one or more conventional FCC feedstocks 105 and one or more high hydrogen content co-feeds 195.

In the configuration shown in FIG. 1, reaction system 110 can include a reactor plus associated separation stages. The feedstock 105 can correspond to, for example, a vacuum gas oil boiling range fraction, or another type of fraction that is typically processed in an FCC reactor. The FCC reaction system 110 can convert a portion of feedstock 105 and biomass oil feed 175 to form various products. These products can include a $C_{4-}$ product 112, a naphtha boiling range product 114, a light cycle oil 116, a heavy cycle oil 118, and main column bottoms 119.

During operation of the FCC reactor 110, coke can form on the catalyst within the reactor. This spent catalyst 127 can be withdrawn into regenerator 120 to form regenerated catalyst 129.

The biomass oil 185 can be formed by exposing biomass 171 to a biomass conversion stage 170. In the example shown in FIG. 1, the biomass conversion stage corresponds to a pyrolysis process, but other types of conversion processes can also be used. Examples of pyrolysis processes suitable for biomass conversion stage 170 in FIG. 1 include, but are not limited to, hydrothermal liquefaction, fast pyrolysis, and catalytic pyrolysis. Biomass conversion stage 170 can generate, for example, a raw biomass oil 175 and a light gas product 172.

Example 1—Co-Processing of Biomass Oil, Vacuum Gas Oil, and Naphtha

FCC co-processing was performed on combined feeds that included pyrolysis oil, vacuum gas oil (i.e., a conventional type of FCC feedstock), and a high hydrogen content naphtha fraction. The pyrolysis oil was formed by fast pyrolysis. Table 2 provides characterization data for the three types of feed components.

TABLE 2

Composition of Feed Components

| <values in wt %> | VGO | Naphtha | Pyrolysis Oil |
|---|---|---|---|
| C | 86.4 | 85.28 | 43.9 |
| H | 11.94 | 14.72 | 6.74 |
| O (Excluding water) | | | 29.3 |
| S | 1.84 | | <3.0 |
| N | 0.14 | | <0.1 |
| $H_2O$ | | | 22.5 |

In Table 2, the pyrolysis oil corresponds to a high oxygen content pyrolysis oil. It is noted that pyrolysis oils formed by some other methods can have lower oxygen contents. For example, pyrolysis oils derived from catalytic pyrolysis and/or hydrothermal liquefaction can have oxygen contents below 25 wt %, or below 20 wt %. With regard to the naphtha, the high hydrogen content naphtha co-feed has a hydrogen content that is greater than the hydrogen content of the vacuum gas oil by 2.0 wt % or more, or 2.5 wt % or more, or 2.7 wt % or more.

The feed components from Table 2 were used to form two types of combined feeds for FCC processing. A first baseline feed included 90 wt % of the vacuum gas oil, 5.0 wt % of the pyrolysis oil, and 5.0 wt % of the high hydrogen content naphtha. A second feed included 80 wt % vacuum gas oil, 5.0 wt % of the pyrolysis oil, and 15 wt % of the high hydrogen content naphtha.

Figure 2:
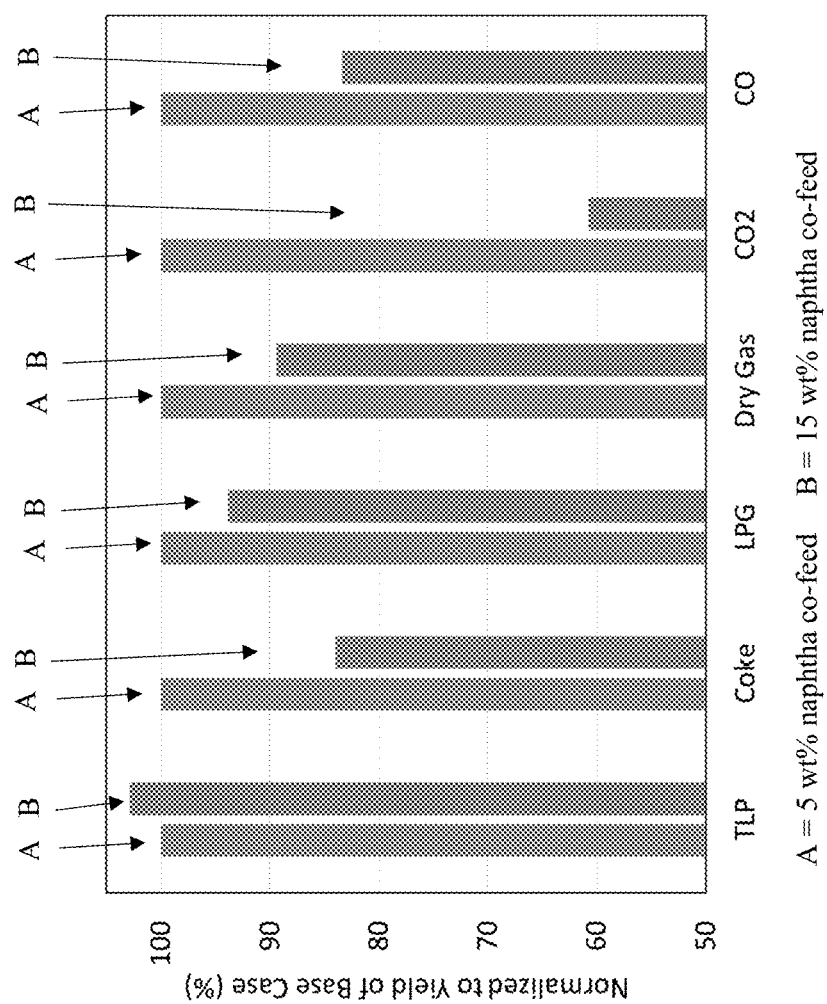
FIG. 2 shows product yields from co-processing of biomass oil and high hydrogen content co-feeds in an FCC reaction system.

FIG. 2 compares the yields of Total Liquid Products (TLP), coke, dry gas ($H_2$, $C_1$ and $C_2$), $CO_2$ and CO for the two types of FCC feeds. For each type of product shown in FIG. 2, the left bar corresponds to results from processing the feed with 5.0 wt % naphtha, while the right bar corresponds to results from processing the feed with 15 wt % naphtha.

As shown in FIG. 2, when the VGO is doped with a higher content of hydrogen-rich naphtha feed (15 wt % naphtha co-feed), the resulting TLP yield is higher, while the yields for the undesired products coke, dry gas, LPG, $CO_2$ and CO are noticeably lower than the base case (5 wt % naphtha co-feed). Without being bound by any particular theory, it is believed that increased hydrogen transfer from the hydrogen-rich hydrocarbon feed to the oxygenates in the pyrolysis oil contributes to this result. In particular, the amount of $CO_2$ generated was reduced by almost 50%, even though only 10 wt % of the input feed was changed from vacuum gas oil to naphtha. Additionally, the amount of coke production was reduced by roughly 15% relative to the baseline case. These substantial decreases in production of coke and $CO_2$ are unexpectedly larger than can be accounted for by simple feed dilution by replacing vacuum gas oil with a lower boiling feed component.

It is noted that the baseline case corresponds to including 5.0 wt % of the high hydrogen content naphtha in the combined feed. Thus, simply adding an equivalent amount of naphtha and biomass oil was not sufficient to achieve the improved product slate illustrated in FIG. 2. Instead, increasing the amount of high hydrogen content co-feed so that the weight percentage of high hydrogen content co-feed is greater than the weight percentage of biomass oil (such as greater by 4.0 wt % or more, or 9.0 wt % or more) provided an unexpectedly improved yield of desirable products while decreasing the yield of coke, dry gas, and carbon oxides.

In addition to improving the yield of total liquid product and reducing the yield of lower value coke and carbon oxides, increasing the amount of the high hydrogen content naphtha co-feed also resulted in an unexpected increase in production of $C_3$ and $C_4$ olefins. Although $C_3$ and $C_4$ hydrocarbons are primarily lower value products, the $C_3$ and $C_4$ olefins generated during FCC processing have higher value due to the ability to separate out such olefins and use them, for example, as polymer feedstock.

Figure 3:
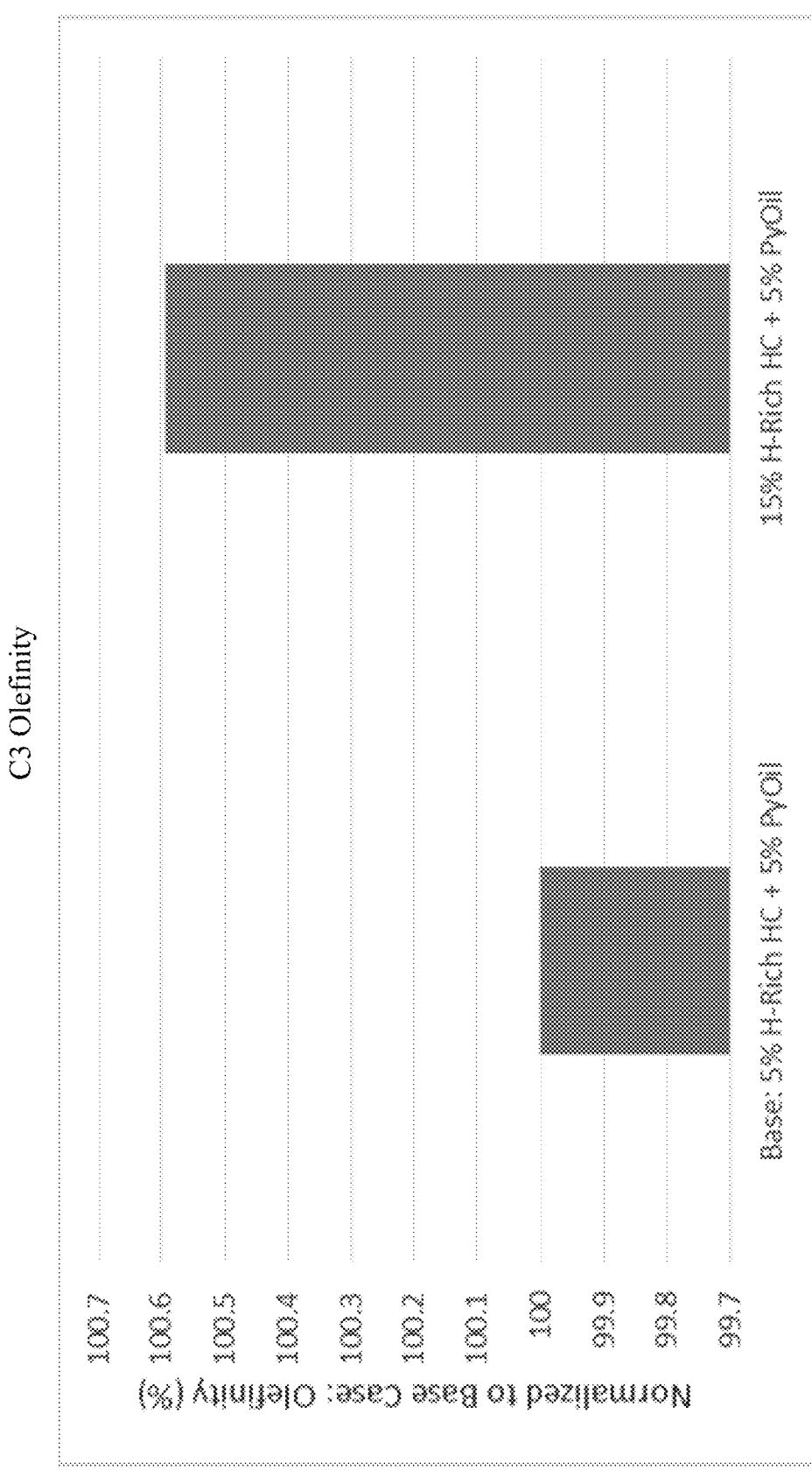
FIG. 3 shows the olefinity of the $C_3$ products from co-processing of biomass oil and high hydrogen content co-feeds in an FCC reaction system.
Figure 4:
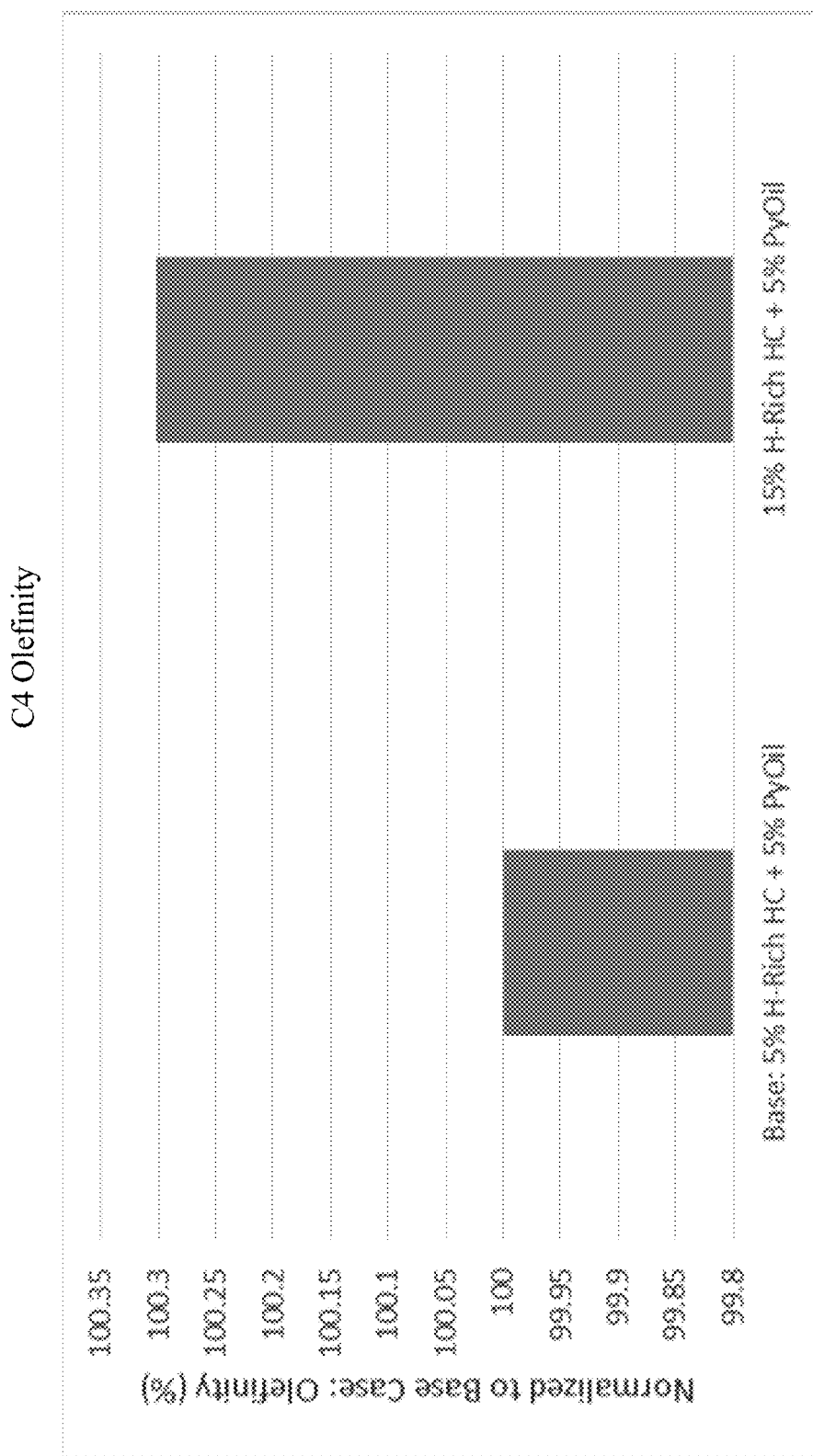
FIG. 4 shows the olefinity of the $C_4$ products from co-processing of biomass oil and high hydrogen content co-feeds in an FCC reaction system.

In order to illustrate the increase in yield of light olefins, the ratio of light olefins having a given carbon number versus the total product having a given carbon number can be determined. This can be referred to as "olefinity". The olefinity of the $C_3$ product (i.e., ratio of $C_3$ olefins to total $C_3$ product) produced by FCC processing of the different types of combined feeds is shown in FIG. 3. FIG. 4 similarly shows the olefinity for the $C_4$ products.

As shown in FIG. 3 and FIG. 4, the ratio of olefins to total light gas product for both the $C_3$ products and the $C_4$ products was increased by increasing the amount of the naphtha co-feed. In FIG. 3 and FIG. 4, the results shown are normalized relative to the baseline feed (5.0 wt % naphtha), so that increases shown in FIGS. 3 and 4 represent increases relative to that baseline. Without being bound by any particular theory, it is believed that a portion of the oxygenates that do not form coke and/or carbon oxides are instead converted by a reaction pathway that results in increased olefin formation.

Figure 5:
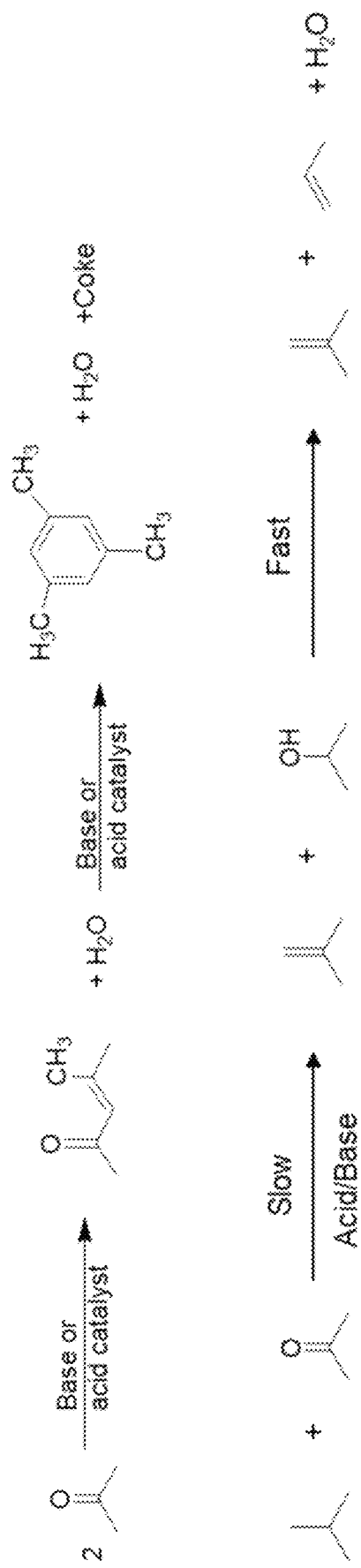
FIG. 5 shows reaction pathways for a model oxygenate in the presence or absence of a hydrogen transfer compound.

FIG. 5 shows an example of how the presence of a hydrogen transfer agent can modify the reaction pathway for an oxygenate so that olefins are formed instead of coke and/or carbon oxides. In the example shown in FIG. 5, the difference in reaction pathways is illustrated using acetone and isobutane as model compounds. In the top equation shown in FIG. 5, multiple ketones are reacted according to an aldol condensation type reaction pathway to ultimately produce an aromatic ring structure, water, and coke. The formation of the ring structure and the coke is driven by the need to provide hydrogen to form water in an environment with a relatively low amount of excess hydrogen. It is noted that many types of feeds used for FCC processing are lower hydrogen content feeds. Such feeds are selected for FCC processing because of the lower hydrogen content, as FCC processing provides a pathway for upgrading such feeds without requiring a separate hydrogen source. Due to the lower hydrogen content of typical FCC feeds, a reaction pathway such as the top pathway in FIG. 5 can be available, as suitable hydrogen transfer compounds may not be readily available in the FCC reaction environment. By contrast, the lower reaction pathway provides an alternative reaction pathway, where a compound capable of hydrogen transfer (such as isobutane, or an alkylated naphthene) form an olefin while the oxygenate compound forms an alcohol. Decomposition of the alcohol can then result in formation of a second olefin, but without formation of an aromatic ring or coke.

It is noted that although FIG. 5 shows use of isobutane (an isoparaffin) as a hydrogen transfer agent, naphthenes can also serve as hydrogen transfer agents. This can result in formation of an aromatic compound if sufficient hydrogen is transferred from a naphthene to an oxygenate. However, coke production can still be avoided, as the conversion of a naphthene to an aromatic does not result in coke production in the manner that is typical for the top reaction pathway shown in FIG. 5.

Example 2—Co-Processing of Biomass Oil and High H Content Vacuum Gas Oil

The reaction pathways illustrated in Example 1, where a high hydrogen content naphtha co-feed was used for FCC co-processing, can also be accessed when co-processing biomass oil with a feedstock including a substantial portion of a high hydrogen content vacuum gas oil fraction.

Table 3 shows an example of feedstocks that could be used to achieve improved products during FCC conversion when co-processing biomass oil. In Table 3, the pyrolysis oil corresponds to the fast pyrolysis oil used in Example 1. The high hydrogen content co-feedstock corresponds to an atmospheric resid fraction from a high saturates, low heteroatom content shale crude oil. Although the high saturates, low heteroatom content co-feedstock is an atmospheric resid, the amount of 566° C.+ components is sufficiently low to allow for processing in an FCC reaction system. Thus, based on the T10 and T90 distillation values, the atmospheric resid primarily includes vacuum gas oil boiling range components.

TABLE 3

Composition of Feed Components

| <values in wt %> | High saturates, low heteratom content atmospheric resid | Pyrolysis Oil |
|---|---|---|
| C | 86.3 | 43.9 |
| H | 13.6 | 6.74 |
| O (Excluding water) |  | 29.3 |
| S | 0.04 | <3.0 |
| N | 0.02 | <0.1 |
| H₂O |  | 22.5 |
| naphthenes | 50 wt % |  |
| T10 (° C.) | 362 |  |
| T90 (° C.) | 583 |  |

As shown in Table 3, the high saturates, low heteroatom content co-feedstock has a hydrogen content of 13.6 wt %. Although this is lower than the hydrogen content of the naphtha co-feed from Example 1, it is noted that vacuum gas oil boiling range fractions with hydrogen contents of 13.2 wt % or more have substantially high contents of naphthenes and/or isoparaffins than corresponding naphtha boiling range fractions. This is due in part to the size difference in the type of compounds present in the two types of fractions. For a naphtha boiling range fraction, the total possible chain length of a compound is limited based on the fact that compounds containing more than roughly 10 carbon atoms tend to boil above the naphtha boiling range. Thus, for any paraffins (including isoparaffins) present in a naphtha fraction, the terminal methyl groups at the ends of the paraffin chains represent a much larger percentage of the total carbon atoms in the fraction as compared with a vacuum gas oil fraction where the average carbon chain length is substantially longer.

By contrast, due in part to the substantially larger number of bonding configurations that can be achieved for the higher carbon number components found in a vacuum gas oil boiling range fraction, achieving a hydrogen content of 13.2 wt % or more corresponds to a vacuum gas oil boiling range fraction with a relatively large content of naphthenes and/or paraffins. So long as sufficient naphthenes and/or isoparaffins are present, such a vacuum gas oil boiling range fraction (having a hydrogen content of 13.2 wt % or more) can provide hydrogen transfer benefits similar to a naphtha fraction with a hydrogen content of 13.8 wt % or more. As an example, the high saturates, low heteroatom content feed shown in Table 3 has a naphthenes content of roughly 50 wt %. This is in contrast, to typical virgin vacuum gas oil fractions, which typically have naphthenes contents of roughly 35 wt % or less.

Additional Embodiments

Embodiment 1. A method for co-processing biomass oil, comprising: exposing a combined feed comprising: 1.0 wt % to 30 wt % biomass oil, relative to a weight of the combined feed, and at least one additional feedstock, the at least one additional feedstock comprising 41 wt % or more of a vacuum gas oil boiling range portion relative to a weight of the combined feed, the vacuum gas oil boiling range portion comprising a hydrogen content of 13.2 wt % or more, to a catalyst in a reactor under fluid catalytic cracking conditions to form at least a cracked effluent.

Embodiment 2. The method of Embodiment 1, wherein the at least one additional feedstock comprises 51 wt % or more of the vacuum gas oil boiling range portion, or wherein the vacuum gas oil boiling range portion comprises a hydrogen content of 13.5 wt % or more, or a combination thereof.

Embodiment 3. The method of any of the above embodiments, wherein the at least one additional feedstock comprises 40 wt % or more of naphthenes relative to a weight of the at least one additional feedstock, or wherein the vacuum gas oil boiling range portion comprises 40 wt % or more of naphthenes relative to a weight of the vacuum gas oil boiling range portion, or a combination thereof.

Embodiment 4. The method of any of the above embodiments, wherein the at least one additional feedstock comprises 25 wt % or less of aromatics relative to a weight of the at least one additional feedstock, or wherein the vacuum gas oil boiling range portion comprises 25 wt % or less of aromatics relative to a weight of the vacuum gas oil boiling range portion, or a combination thereof.

Embodiment 5. The method of any of the above embodiments, wherein the at least one additional feedstock comprises a T10 distillation point of 340° C. or more, or wherein the at least one additional feedstock comprises a T90 distillation point of 566° C. or less, or a combination thereof.

Embodiment 6. A method for co-processing biomass oil, comprising: exposing a combined feed comprising: 1.0 wt % to 30 wt % biomass oil, relative to a weight of the combined feed, 5.0 wt % to 40 wt %, relative to the weight of the combined feed, of one or more co-feeds having a hydrogen content of 13.8 wt % or more relative to a weight of the one or more co-feeds, the weight percentage of the one or more co-feeds being greater than the weight percentage of the biomass oil, and 30 wt % or more of one or more feedstocks, relative to a weight of the combined feed, comprising at least one of i) a T10 distillation point of 316° C. or higher and ii) a T50 distillation point of 400° C. or higher, to a catalyst in a reactor under fluid catalytic cracking conditions to form at least a cracked effluent.

Embodiment 7. The method of Embodiment 6, wherein the weight percentage of the one or more co-feeds is greater than the weight percentage of the biomass oil by 4.0 wt % or more, or wherein the combined feed comprises 5.0 wt % to 20 wt % of biomass oil, or a combination thereof.

Embodiment 8. The method of Embodiment 6 or 7, wherein the one or more co-feeds comprise a hydrogen content of 14.5 wt % or more relative to a weight of the one or more co-feeds, or wherein the one or more feedstocks comprise a hydrogen content of 13.2 wt % or less relative to a weight of the one or more feedstocks, or a combination thereof.

Embodiment 9. The method of any of Embodiments 6-8, wherein the one or more feedstocks comprise a hydrogen content of 12.5 wt % or less relative to a weight of the one or more feedstocks, or wherein the hydrogen content of the one or more co-feeds is greater than a hydrogen content of the one or more feedstocks by 2.0 wt % or more, or a combination thereof.

Embodiment 10. The method of any of Embodiments 6-9, wherein the one or more co-feeds comprise 25 wt % or more of naphthenes relative to a weight of the one or more co-feeds, or wherein the one or more co-feeds comprise 15 wt % or less of aromatics relative to a weight of the one or more co-feeds, or a combination thereof.

Embodiment 11. The method of any of Embodiments 6-10, wherein the one or more co-feeds comprise a naphtha fraction, or wherein the one or more co-feeds comprise a T90 distillation point of 221° C. or less, or a combination thereof.

Embodiment 12. The method of any of Embodiments 6-11, wherein the one or more feedstocks comprise one or more hydrotreated feedstocks.

Embodiment 13. The method of any of the above embodiments, i) wherein the biomass oil comprises a pyrolysis oil, ii) wherein the biomass oil comprises 5.0 wt % or more of oxygen relative to a weight of the biomass oil, iii) wherein the biomass oil comprises 10 wt % or less of fatty acid alkyl esters relative to a weight of the biomass oil, or iv) a combination of two or more of i), ii) and iii).

Embodiment 14. The method of any of the above embodiments, wherein the combined feed comprises 1.0 wt % or more of oxygen relative to a weight of the combined feed, or wherein the combined feed comprises 5.0 wt % to 20 wt % of biomass oil, or a combination thereof.

Embodiment 15. The method of any of the above embodiments, further comprising converting a biomass feed under biomass conversion conditions to form a light gas product and a liquid product, the biomass oil comprising at least a portion of the liquid product.

Additional Embodiment A. The method of any of the above embodiments, wherein the combined feed is formed by combining the biomass oil, the one or more co-feeds, and the one or more feedstocks in the reactor, or wherein the combined feed is formed by combining the biomass oil and the at least one additional feedstock in the reactor.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for co-processing biomass oil, comprising: exposing a combined feed comprising:
   1.0 wt % to 30 wt % biomass oil, relative to a weight of the combined feed, and
   at least one additional feedstock, the at least one additional feedstock comprising 41 wt % or more of a vacuum gas oil boiling range portion relative to a weight of the combined feed, the vacuum gas oil boiling range portion comprising a hydrogen content of 13.2 wt % or more, wherein the at least one additional feedstock comprises 40 wt % or more of naphthenes relative to a weight of the at least one additional feedstock, or wherein the vacuum gas oil boiling range portion comprises 40 wt % or more of naphthenes relative to a weight of the vacuum gas oil boiling range portion, or a combination thereof,
   to a catalyst in a reactor under fluid catalytic cracking conditions to form at least a cracked effluent.

2. The method of claim 1, wherein the at least one additional feedstock comprises 51 wt % or more of the vacuum gas oil boiling range portion.

3. The method of claim 1, wherein the vacuum gas oil boiling range portion comprises a hydrogen content of 13.5 wt % or more.

4. The method of claim 1, wherein the at least one additional feedstock comprises 25 wt % or less of aromatics relative to a weight of the at least one additional feedstock, or wherein the vacuum gas oil boiling range portion comprises 25 wt % or less of aromatics relative to a weight of the vacuum gas oil boiling range portion, or a combination thereof.

5. The method of claim 1, wherein the at least one additional feedstock comprises a T10 distillation point of 340° C. or more, or wherein the at least one additional feedstock comprises a T90 distillation point of 566° C. or less, or a combination thereof.

6. The method of claim 1, wherein the biomass oil comprises a pyrolysis oil, or wherein the biomass oil comprises 5.0 wt % or more of oxygen relative to a weight of the biomass oil, or a combination thereof.

7. The method of claim 1, wherein the combined feed comprises 1.0 wt % or more of oxygen relative to a weight of the combined feed.

8. The method of claim 1, wherein the combined feed comprises 5.0 wt % to 20 wt % of biomass oil.

9. The method of claim 1, further comprising converting a biomass feed under biomass conversion conditions to form a light gas product and a liquid product, the biomass oil comprising at least a portion of the liquid product.

10. The method of claim 1, wherein the biomass oil comprises 10 wt % or less of fatty acid alkyl esters relative to a weight of the biomass oil.

11. The method of claim 1, wherein the combined feed comprises 2.0 wt % or more of oxygen relative to a weight of the combined feed.

12. The method of claim 1, wherein the combined feed comprises 3.0 wt % or more of oxygen relative to a weight of the combined feed.

13. The method of claim 1, wherein the biomass oil comprises 12.0 wt % or more of oxygen relative to a weight of the biomass oil, or a combination thereof.

14. The method of claim 1, wherein the biomass oil comprises 20.0 wt % or more of oxygen relative to a weight of the biomass oil, or a combination thereof.

* * * * *